(12) United States Patent
Tenny

(10) Patent No.: US 9,084,191 B2
(45) Date of Patent: Jul. 14, 2015

(54) METHOD AND APPARATUS FOR DETERMINING TIMING INFORMATION FOR CELLS

(75) Inventor: Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 604 days.

(21) Appl. No.: 13/354,020

(22) Filed: Jan. 19, 2012

(65) Prior Publication Data

US 2012/0190373 A1 Jul. 26, 2012

Related U.S. Application Data

(60) Provisional application No. 61/434,779, filed on Jan. 20, 2011.

(51) Int. Cl.
*H04W 56/00* (2009.01)

(52) U.S. Cl.
CPC .................. *H04W 56/0015* (2013.01)

(58) Field of Classification Search
CPC ..... H04W 64/00; H04W 24/10; H04W 36/30; H04W 36/18
USPC ........ 455/404.2, 456.1, 502, 422.1, 423, 436, 455/443; 370/324, 350, 503, 504, 510
See application file for complete search history.

(56) References Cited

U.S. PATENT DOCUMENTS

| | | | |
|---|---|---|---|
| 2003/0231612 A1* | 12/2003 | Kim et al. ..................... | 370/342 |
| 2005/0037786 A1* | 2/2005 | Edge ............................. | 455/502 |
| 2007/0105553 A1* | 5/2007 | Madsen ........................ | 455/434 |
| 2010/0234028 A1* | 9/2010 | Narasimha et al. ........... | 455/437 |
| 2010/0240396 A1 | 9/2010 | Zhang et al. | |
| 2010/0317343 A1 | 12/2010 | Krishnamurthy et al. | |

(Continued)

FOREIGN PATENT DOCUMENTS

| WO | WO0173467 A2 | 10/2001 |
|---|---|---|
| WO | 2011102769 A1 | 8/2011 |

OTHER PUBLICATIONS

Partial International Search Report—PCT/US2012/022084—ISA/EPO—May 15, 2012.

(Continued)

*Primary Examiner* — Dung Hong
(74) *Attorney, Agent, or Firm* — Arent Fox LLP

(57) ABSTRACT

Techniques for determining timing information for cells are disclosed. A user equipment (UE) may communicate with a serving cell and may need to make measurements of other cells, e.g., to support positioning of the UE. Each cell may transmit reference signals based on its timing. Different cells may operate asynchronously or with unknown timing. The UE may send a request for measurement gaps to the serving cell and may include timing information in the request. The timing information may (directly or indirectly) convey relative timing between the serving cell and a reference cell. The serving cell may determine measurement gaps at the proper time for other cells based on the timing information from the UE and may avoid scheduling the UE for data transmission during the measurement gaps. The UE may make measurements of other cells during the measurement gaps, without losing any data from the serving cell.

43 Claims, 8 Drawing Sheets

(56) References Cited

U.S. PATENT DOCUMENTS

| | | |
|---|---|---|
| 2010/0331009 A1 | 12/2010 | Krishnamurthy et al. |
| 2011/0039577 A1 | 2/2011 | Stern-Berkowitz et al. |
| 2011/0085460 A1 | 4/2011 | Zhang et al. |
| 2011/0143770 A1* | 6/2011 | Charbit et al. ............ 455/456.1 |
| 2011/0201279 A1* | 8/2011 | Suzuki et al. ............ 455/67.11 |
| 2011/0201332 A1 | 8/2011 | Siomina et al. |
| 2012/0083221 A1* | 4/2012 | Ranta-Aho et al. ........ 455/67.11 |
| 2012/0307670 A1* | 12/2012 | Kazmi et al. .................. 370/252 |
| 2013/0260793 A1* | 10/2013 | Lim et al. .................. 455/456.1 |

OTHER PUBLICATIONS

International Search Report and Written Opinion—PCT/US2012/022084—ISA/EPO—Aug. 27, 2012.

Nokia Siemens Networks et al., "Measurement Gap Creation", 3GPP Draft; R4-070927, 3rd Generation Partnership Project (3GPP), Mobile Competence Centre; 650, Route Des Lucioles; F-06921 Sophia-Antipolis Cedex; France, vol. RAN WG4, No. Orlando, FL; Jun. 21, 2007, XP050177401, [retrieved on Jun. 21, 2007] the whole document.

* cited by examiner

METHOD AND APPARATUS FOR DETERMINING TIMING INFORMATION FOR CELLS

The present application claims priority to provisional U.S. Application Ser. No. 61/434,779, entitled METHOD AND APPARATUS FOR SENDING TIMING INFORMATION IN A REQUEST FOR MEASUREMENT GAPS, filed Jan. 20, 2011, and incorporated herein by reference in its entirety.

BACKGROUND

I. Field

The present disclosure relates generally to communication, and more specifically to techniques for determining timing information for cells in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of user equipments (UEs). The term "cell" can refer to a coverage area of a base station and/or a base station subsystem serving the coverage area. A UE may communicate with a serving cell and may need to make measurements of other cells for various purposes. It may be desirable to support measurements of other cells by the UE.

SUMMARY

Techniques for determining timing information for cells are disclosed herein. A UE may communicate with a serving cell and may need to make measurements of other cells, e.g., for positioning of the UE. Each cell may transmit a reference signal based on its timing. Different cells may operate asynchronously or with unknown timing. The UE may send a request for measurement gaps to the serving cell and may include timing information for cells in the request. The serving cell may determine measurement gaps at the proper time for other cells based on the timing information from the UE. The serving cell may also avoid scheduling the UE for data transmission during the measurement gaps. The UE may then make measurements of the other cells during the measurement gaps, without losing any data from the serving cell.

In one design, a UE may determine a first timing offset between an intermediate cell and a serving cell of the UE. The intermediate cell may be a prior serving cell of the UE, a cell previously used by the UE, or some other cell. The UE may also determine a second timing offset between a reference cell and the intermediate cell, e.g., without actually making measurements of the reference cell. The reference cell may be a cell whose timing is used as a reference, and the timing of other cells may be given relative to the timing of the reference cell. The UE may determine a third timing offset between the reference cell and the serving cell based on the first and second timing offsets. The UE may then determine timing information based on the third timing offset. The timing information may comprise the third timing offset between the reference cell and the serving cell or a fourth timing offset between a cell to be measured by the UE and the serving cell. The UE may send a message comprising the timing information and a request for idle periods for measurements of cells. The UE may thereafter receive a measurement gap pattern determined based on the timing information. The UE may make measurements of cells during idle periods indicated by the measurement gap pattern. The UE may use the measurements of cells for positioning of the UE, e.g., to compute a location estimate for the UE.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Figure 1:
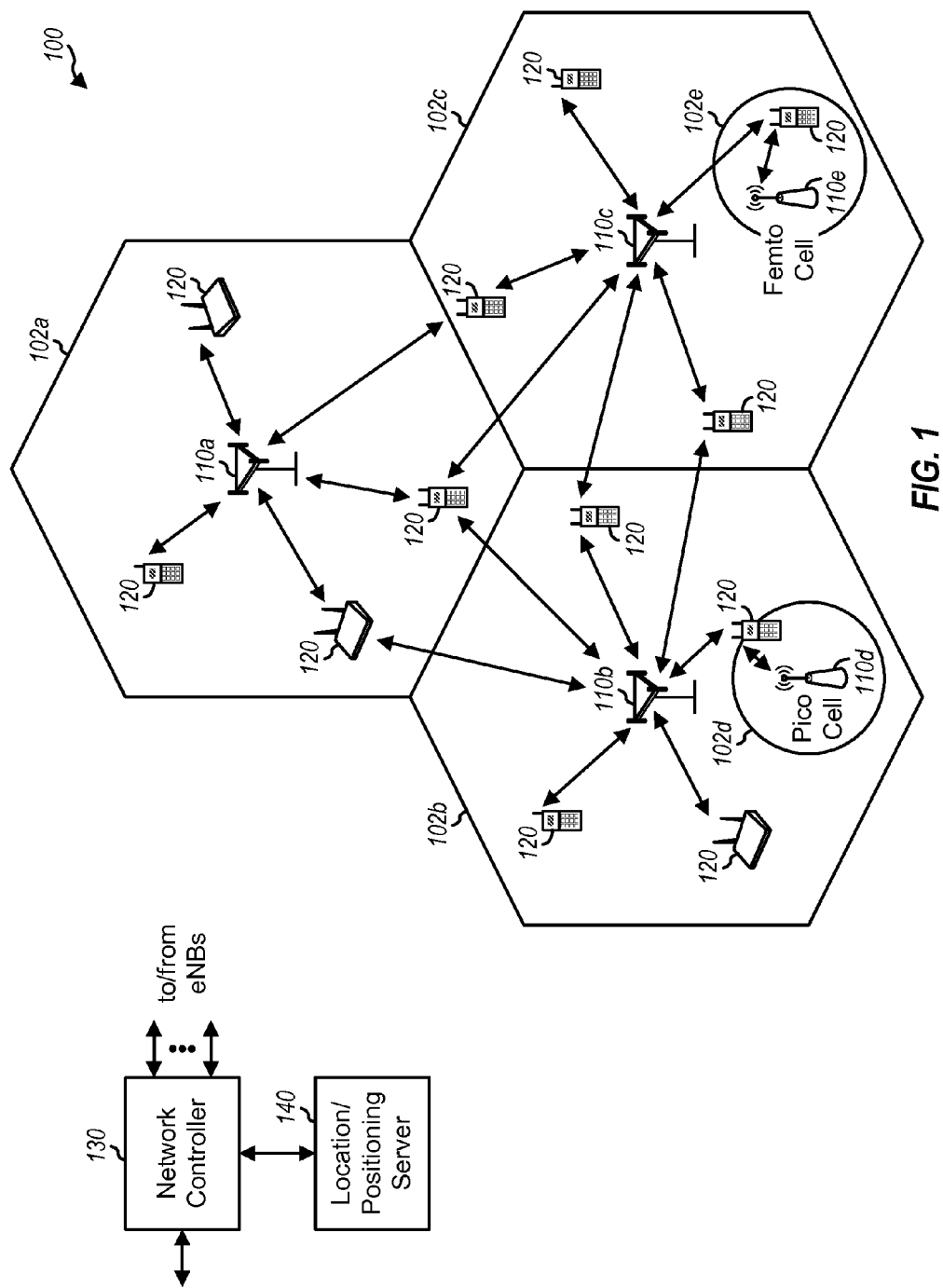
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. An eNB 110d may be a pico eNB for a pico cell 102d. An eNB 110e may be a femto eNB for a femto cell 102e. The terms "cell", "eNB", and "base station" may be used interchangeably.

Wireless network 100 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul. A location/positioning server 140 may couple to network controller 130 and may support location services and/or positioning for UEs. Positioning refers to a functionality that determines a geographical location of a target UE. Location services refer to services that utilize location information (e.g., location estimates for UEs).

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a smart phone, a tablet, a wireless communication device, a personal digital assistant (PDA), a wireless modem, a handheld device, a laptop computer, a cordless phone, a wireless local loop (WLL) station, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB. A UE may also be able to communicate peer-to-peer (P2P) with other UEs.

Figure 2:
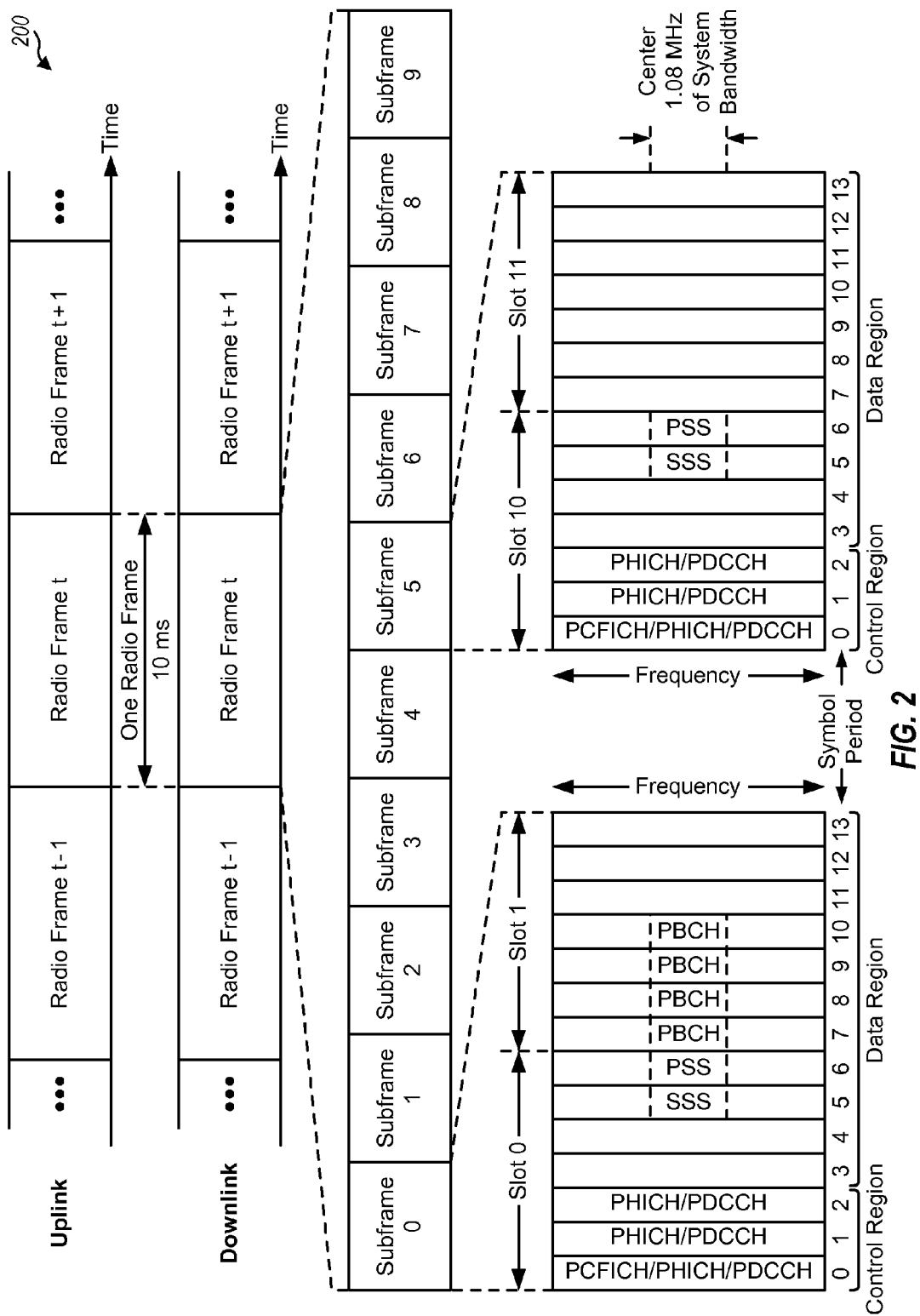
FIG. 2 shows an exemplary frame structure.

FIG. 2 shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

As shown in FIG. 2, on the downlink in LTE, a cell may transmit a Physical Control Format Indicator Channel (PCFICH), a Physical HARQ Indicator Channel (PHICH), and a Physical Downlink Control Channel (PDCCH) in a control region of a subframe. The PCFICH may convey the size of the control region. The PHICH may carry acknowledgement (ACK) and negative acknowledgement (NACK) feedback for data transmission sent on the uplink with HARQ. The PDCCH may carry downlink grants, uplink grants, and/or other control information. The cell may also transmit a Physical Downlink Shared Channel (PDSCH) in a data region of a subframe (not shown in FIG. 2). The PDSCH may carry data for UEs scheduled for data transmission on the downlink.

The cell may also transmit a primary synchronization signal (PSS) and a secondary synchronization signal (SSS) on the downlink in the center 1.08 MHz of the system bandwidth. For FDD, the PSS and SSS may be transmitted in symbol periods 6 and 5, respectively, in subframes 0 and 5 of each radio frame with the normal cyclic prefix, as shown in FIG. 2. The PSS and SSS may be used by the UEs for cell search and acquisition. The cell may also transmit a Physical Broadcast Channel (PBCH) in symbol periods 0 to 3 in slot 1 of certain radio frames, as shown in FIG. 2. The PBCH may carry some system information such as a master information block (MIB). The cell may transmit other system information such as system information blocks (SIBs) on the PDSCH in certain subframes.

The cell may also transmit a cell-specific reference signal (CRS) in certain symbol periods of each subframe. A reference signal is a signal that is known a priori by a transmitter and a receiver and may also be referred to as pilot. A CRS is a reference signal that is specific for a cell, e.g., generated based on a cell identity (ID). The cell may transmit a CRS from two antenna ports 0 and 1 in symbol periods 0, 4, 7 and 11 of each subframe. The cell may also transmit the CRS from two additional antenna ports 2 and 3 in symbol periods 1 and 8 of each subframe. The cell may transmit CRS on evenly spaced subcarriers, which may be determined based on the cell ID. The cell may also transmit other reference signals such as a positioning reference signal (PRS), a channel state information reference signal (CSI-RS), etc.

Wireless network 100 may support operation on a single frequency or multiple frequencies. A frequency may also be referred to as a carrier, a frequency channel, etc. For example, a different set of cells may be supported on each of multiple frequencies. Cells operating on the same frequency may be referred to as intra-frequency cells. Cells operating on different frequencies may be referred to as inter-frequency cells.

A UE may communicate with a serving cell on one frequency, which may be referred to as a serving frequency. The UE may make measurements of other cells on the serving frequency, which may be referred to as intra-frequency measurements. The UE may also make measurements of other cells on one or more frequencies other than the serving frequency, which may be referred to as inter-frequency measurements. A cell for which to make measurements may be referred to as a measurement cell. A frequency on which a measurement cell operates may be referred to as a target frequency. The measurements may be of various types and may be used for various purposes. For example, the UE may make measurements for observed time difference of arrival (OTDOA) of different cells detected by the UE. An OTDOA measurement for two cells may indicate the difference in the timing of the two cells, e.g., the difference between the start of a designated radio frame (e.g., radio frame 0) of one cell and the start of the designated radio frame of another cell. The OTDOA measurements for different cells may be used for positioning to determine a location estimate for the UE.

A UE may perform inter-frequency measurements in order to support positioning of the UE. For an inter-frequency measurement, the UE may tune away from the serving frequency, make measurements of reference signals from one or more measurement cells on another frequency, then tune back to the serving frequency. The serving cell may configure the UE with a measurement gap pattern to provide the UE with tune-away opportunities for inter-frequency measurements. A measurement gap pattern may also be referred to as a transmission gap pattern, etc. A measurement gap pattern may comprise a periodic sequence of gaps (e.g., time intervals) during which the UE is not scheduled for data transmission by the serving cell. Hence, the UE would not need to monitor the serving cell during the gaps defined by the measurement gap pattern and can tune away to make measurements on other frequencies without missing a scheduled data transmission from the serving cell.

Figure 3:
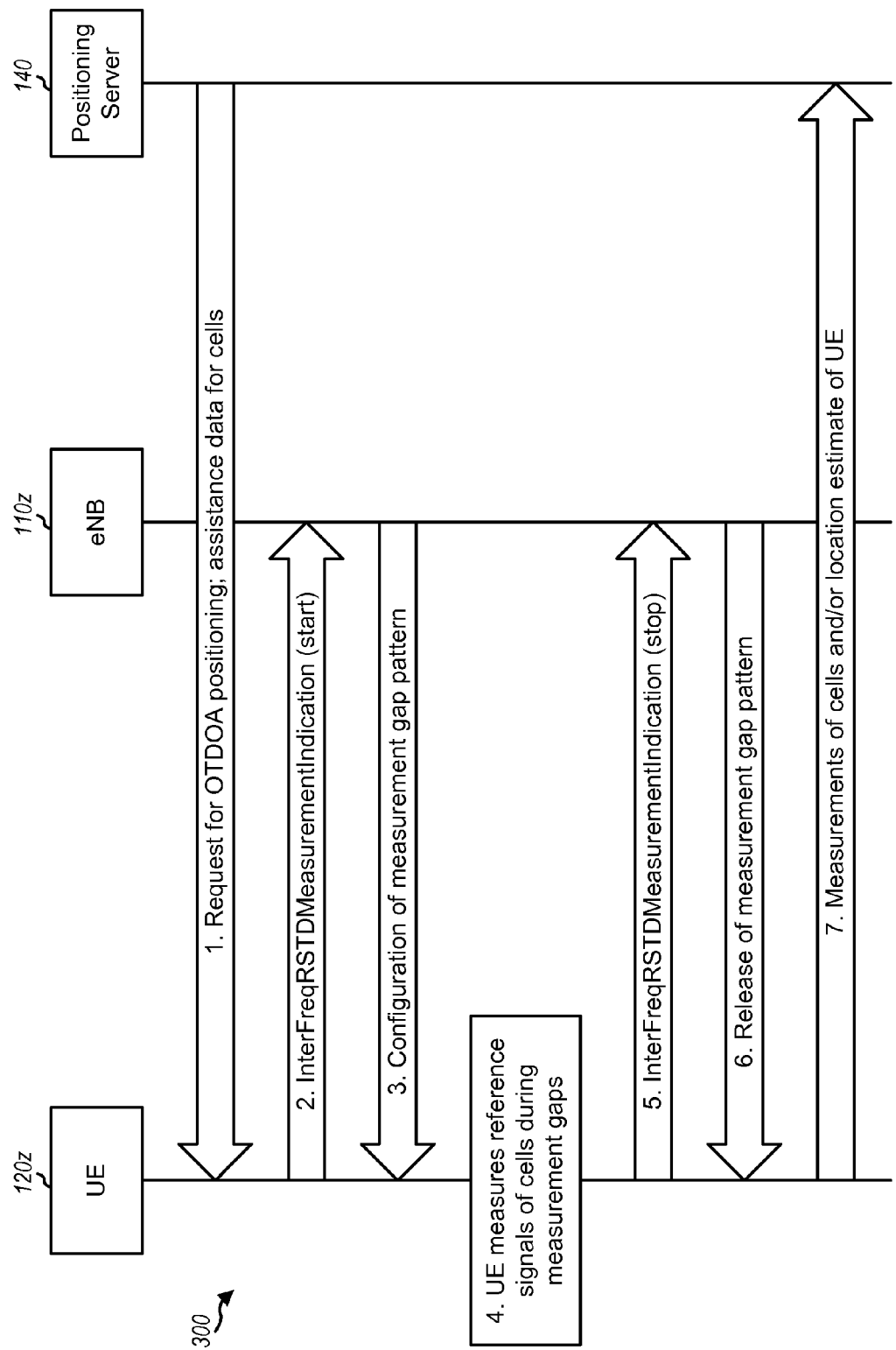
FIG. 3 shows a process to support positioning of a UE.

FIG. 3 shows a call flow of a process 300 for supporting inter-frequency OTDOA. A UE 120z may communicate with a serving cell/eNB 110z. UE 120z may be one of the UEs in FIG. 1, and serving cell/eNB 110z may be one of the eNBs in FIG. 1. UE 120z may receive a request for OTDOA positioning from positioning server 140 (step 1). The request may come via an LTE Positioning Protocol (LPP) message that is transparent to serving cell 110z, which means that serving cell 110z may not be aware of the need of UE 120z to perform OTDOA measurements. UE 120z may also receive assistance data from positioning server 140. The assistance data may include information for intra-frequency cells and/or inter-frequency cells and may be used by UE 120z to make OTDOA measurements for the cells. The assistance data may thus be referred to as OTDOA assistance data.

UE 120z may send an uplink message to notify serving cell 110z that OTDOA measurements requiring measurement gaps have been requested from UE 120z (step 2). This message may be an InterFreqRSTDMeasurementIndication message defined in 3GPP TS 36.331 or some other message. Serving cell 110z may receive the uplink message from UE 120z and may determine a suitable measurement gap pattern for UE 120z. Serving cell 110z may then return a configuration of the measurement gap pattern to UE 120z (step 3).

UE 120z may receive the measurement gap pattern from serving cell 110z and may determine measurement gaps for UE 120z. UE 120z may thereafter make measurements of reference signals and/or other signals of intra-frequency cells and/or inter-frequency cells during the measurement gaps indicated by the measurement gap pattern (step 4). At some point later in time, UE 120z may send another uplink message to notify serving cell 110z that the measurement gaps are no longer needed by UE 120z (step 5). Serving cell 110z may receive the uplink message from UE 120z and may return a release of measurement gap pattern to UE 120z (step 6). UE 120z may also send measurements and/or a location estimate to positioning server 140 (step 7). The steps in FIG. 3 may be performed in a different order than the order shown in FIG. 3.

As shown in FIG. 3, for OTDOA, serving cell 110z may not be aware that UE 120z has been instructed to perform inter-frequency measurements for other cells, since the instruction may come via a higher layer protocol (e.g., LPP) that is transparent to the serving cell. UE 120z may then request for measurement gaps from serving cell 110z by sending an InterFreqRSTDMeasurementIndication message. A "start" version of this message may include the semantics of a request for measurement gaps. This message should also include sufficient information to allow serving cell 110z to determine when, based on its own timeline, reference signals are transmitted by cells on each of the target frequencies. This information may comprise an indication of the timing of reference signals on one or more target frequencies. For example, UE 120z may provide a prs-SubframeOffset value for each target frequency of interest. A prs-SubframeOffset value for a target frequency may indicate the difference between the start of a subframe carrying positioning reference signals transmitted by a cell on the target frequency and the start of a subframe carrying positioning reference signals transmitted by a serving cell. UE 120z may provide a prs-SubframeOffset value for each target frequency for which this value is available, e.g., for which the value was provided in assistance data sent to UE 120z.

A UE may receive assistance data for making cell measurements from a positioning server (e.g., in step 1 in FIG. 3). The assistance data may comprise timing information for cells on one or more frequencies and may be used by the UE to measure reference signals from cells on the one or more frequencies. The assistance data is typically provided relative to a reference cell, and not necessarily relative to a serving cell of the UE. A reference cell is a cell whose timing is used as a reference. The timing of other cells may be given relative to the timing of the reference cell. For example, the assistance data may include timing offsets for one or more cells, with the timing offset for each cell being determined based on the timing of a measurable signal transmitted by that cell relative to the timing of the measurable signal transmitted by the reference cell. If the reference cell is not on the serving frequency, or if not all cells on the serving frequency are time aligned, then knowing the timing offset between a cell on a target frequency and the serving cell may not be sufficient for the serving cell to decide when it should provide measurement gaps to the UE.

An example of the problem may be as follows. The UE may operate in a wireless network in which macro cells in the wireless network are synchronized on each of multiple frequencies. However, the UE may have a femto cell (e.g., a home eNB (HeNB)) as its serving cell. This femto cell may not be time-aligned with the macro cells and may not itself support OTDOA. Each frequency may have a single timeline for transmissions of reference signals by the cells on that frequency. Unsynchronized femto cells may not participate in this transmission of reference signals. The UE may be provided with a timing offset for each of the multiple frequencies, relative to the timing of the reference cell. However, the serving cell may be unable to translate these timing offsets into its own unsynchronized timeline. A similar problem may arise in other situations where the UE has an unsynchronized cell as its serving cell or where the assistance data provided to the UE does not convey the timing of the reference cell relative to that of the serving cell.

In an aspect, a UE may determine a timing offset between a reference cell and a serving cell of the UE. The timing offset between the reference cell and the serving cell may be used to determine a timing offset between a measurement cell and the serving cell. A measurement gap pattern may then be determined for the UE based on the timing offset between the measurement cell and the serving cell.

Figure 4:
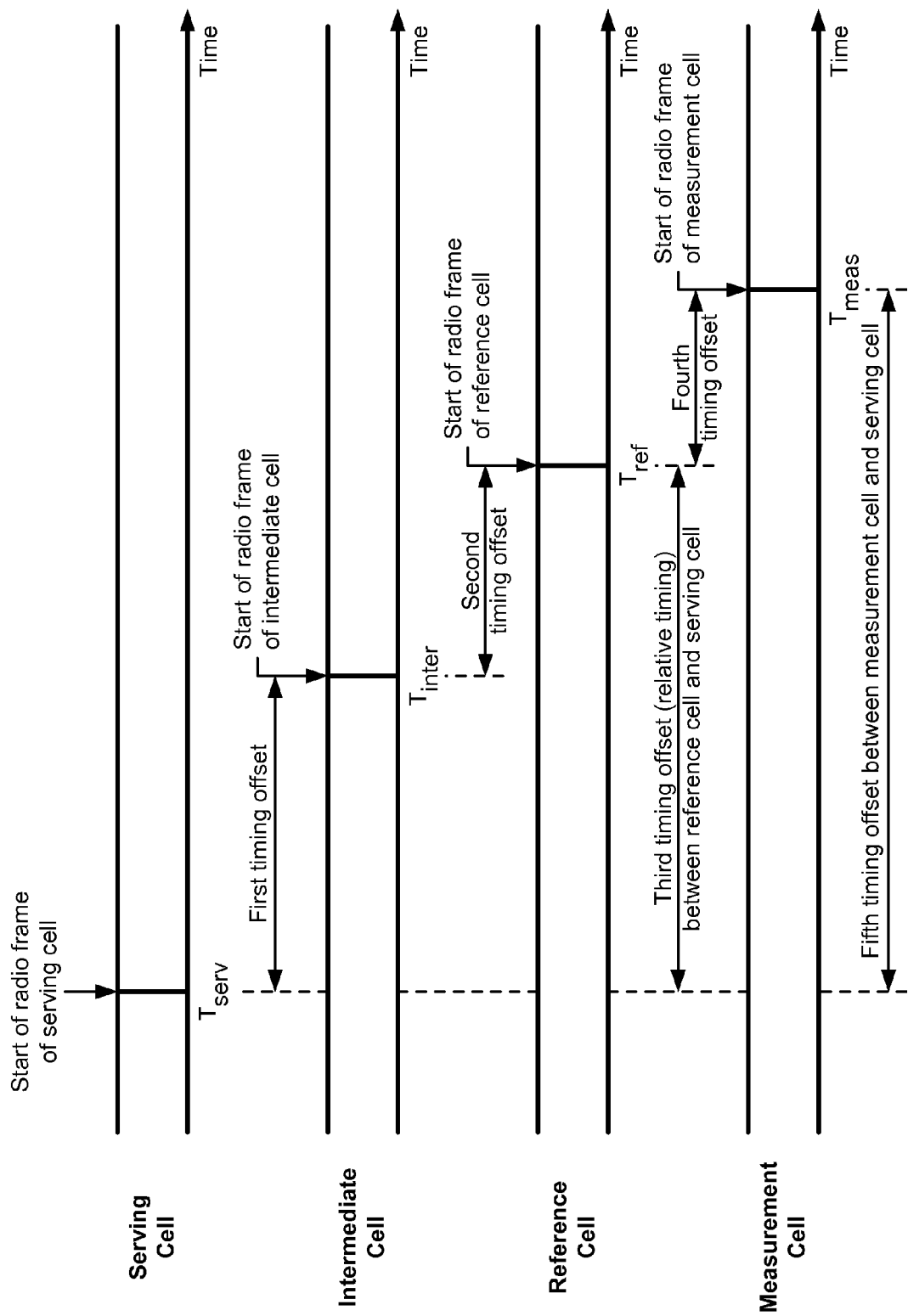
FIG. 4 shows a timing diagram of cells.

FIG. 4 shows a timing diagram of different cells. The timing of a serving cell of a UE is shown at the top of FIG. 4. The start of a designated radio frame of the serving cell is at time $T_{serv}$. The timing of an intermediate cell is shown below the timing of the serving cell in FIG. 4. The start of the designated radio frame of the intermediate cell is at time $T_{inter}$. The intermediate cell may be a cell previously detected and measured by the UE and may be one of the following:

a prior serving cell of the UE,
a cell on which the UE has previously camped in an idle mode,
a cell previously used by the UE for any purpose, or
some other cell.

A timing offset between the intermediate cell and the serving cell may be expressed as:

$$\Delta T_{inter,serv} = T_{inter} - T_{serv}. \qquad \text{Eq (1)}$$

As shown in FIG. 4 and equation (1), a timing offset between a first cell and a second cell is the difference between a designated time (e.g., the start of radio frame 0) for the first cell and the designated time for the second cell. The timing offset between the first cell and the second cell may also be referred to as relative timing between the first and second cells, or timing difference between the first and second cells, etc.

The timing of a reference cell is shown below the timing of the intermediate cell in FIG. 4. The start of the designated radio frame of the reference cell is at time $T_{ref}$. A timing offset between the reference cell and the intermediate cell may be expressed as:

$$\Delta T_{ref,inter} = T_{ref} - T_{inter}. \qquad \text{Eq (2)}$$

A timing offset between the reference cell and the serving cell may be expressed as:

$$\Delta T_{ref,serv} = \Delta T_{ref,inter} + \Delta T_{inter,serv} \qquad \text{Eq (3)}$$

The timing of a measurement cell is shown at the bottom of FIG. 4. The start of the designated radio frame of the measurement cell is at time $T_{meas}$. A timing offset between the measurement cell and the serving cell may be expressed as:

$$\Delta T_{meas,serv} = \Delta T_{meas,ref} + \Delta T_{ref,serv}. \qquad \text{Eq (4)}$$

For clarity, FIG. 4 shows the timing of a single measurement cell. In general, there may be any number of measurement cells, which may have the same or different timing. A timing offset between each measurement cell and the serving cell may be determined as shown in equation (4) and may be used to determine a measurement gap pattern for the UE.

As shown in FIG. 4, measurement cells may transmit their signals (e.g., reference signals) based on their own timing, which may be different from the timing of the serving cell. The UE may receive assistance data that may provide the timing of the measurement cells relative to the timing of the reference cell. The reference cell may be different from the serving cell. In this case, the UE would need to determine the timing offset between the reference cell and the serving cell. This timing offset may be used with the assistance data to determine the timing of the measurement cells relative to the timing of the serving cell, e.g., as shown in equation (4). The timing of the measurement cells relative to the timing of the serving cell may be used by the serving cell to determine measurement gaps (which are given based on the timing of the serving cell) at appropriate times for the measurement cells, so that these measurement cells can be measured by the UE.

The timing offset between the reference cell and the serving cell may be determined without having to actually measure the reference signals of the reference cell to determine the timing of the reference cell. This may be achieved by determining the first timing offset between the intermediate cell and the serving cell. The first timing offset may be available at the UE, without having to make new measurements to determine the timing of the intermediate cell. The second timing offset between the reference cell and the intermediate cell may be determined, e.g., without having to measure/determine the timing of the reference cell, as described below. For example, the second timing offset may be assumed to be zero if the intermediate cell and the reference cell are synchronous or semi-synchronous and have the same or similar timing. The second timing offset may also be available from (or ascertainable based on) assistance data provided to the UE. The timing offset (i.e., the relative timing) between the reference cell and the serving cell may then be determined based on the first and second timing offsets, e.g., as shown in equation (3).

The UE may determine the timing offset between the reference cell and the serving cell in various manners. This timing offset may not be self-evident to the UE. For example, the serving cell may be an unsynchronized femto cell and may operate based on an arbitrary timeline. Hence, there may not be a connection between the timing of the femto cell and the timing of even intra-frequency macro cells.

Various schemes may be used to determine the (radio frame-level) timing of a given cell visible to the UE with a high likelihood of success. The applicability of each scheme may depend on the state of the UE in the serving cell and the UE's knowledge of neighbor cells (and not necessarily knowledge of the reference cell itself).

In a first scheme, the UE may determine the timing offset between the intermediate cell and the serving cell based on the timing of a cell previously used by the UE. The UE may arrive at a current serving cell B via reselection or handover from a prior serving cell A. Reselection refers to selection of a new serving cell when a UE is in an idle mode. Handover refers to selection of a new serving cell when a UE is in a connected/active mode. The UE can readily determine the timing relationship between the current serving cell B and the prior serving cell A at the time of reselection or handover. For example, reselection from the prior serving cell A to the current serving cell B may normally be triggered based on measurements taken by the UE towards cell B while the UE is camped in cell A. During this measurement procedure, the UE may need to read some system information from cell B and may thus slew its receive timeline from being aligned with downlink reception in cell A to being aligned with downlink reception in cell B. The amount of time by which the UE slews its receive timeline provides a subframe offset, which is the timing offset between radio frame boundaries in the two cells. The UE may determine a system frame number (SFN) of cell B, which may take place during the reading of system information from cell B. The UE may then have sufficient information to determine the relative timing between cell A and cell B.

Figure 5:
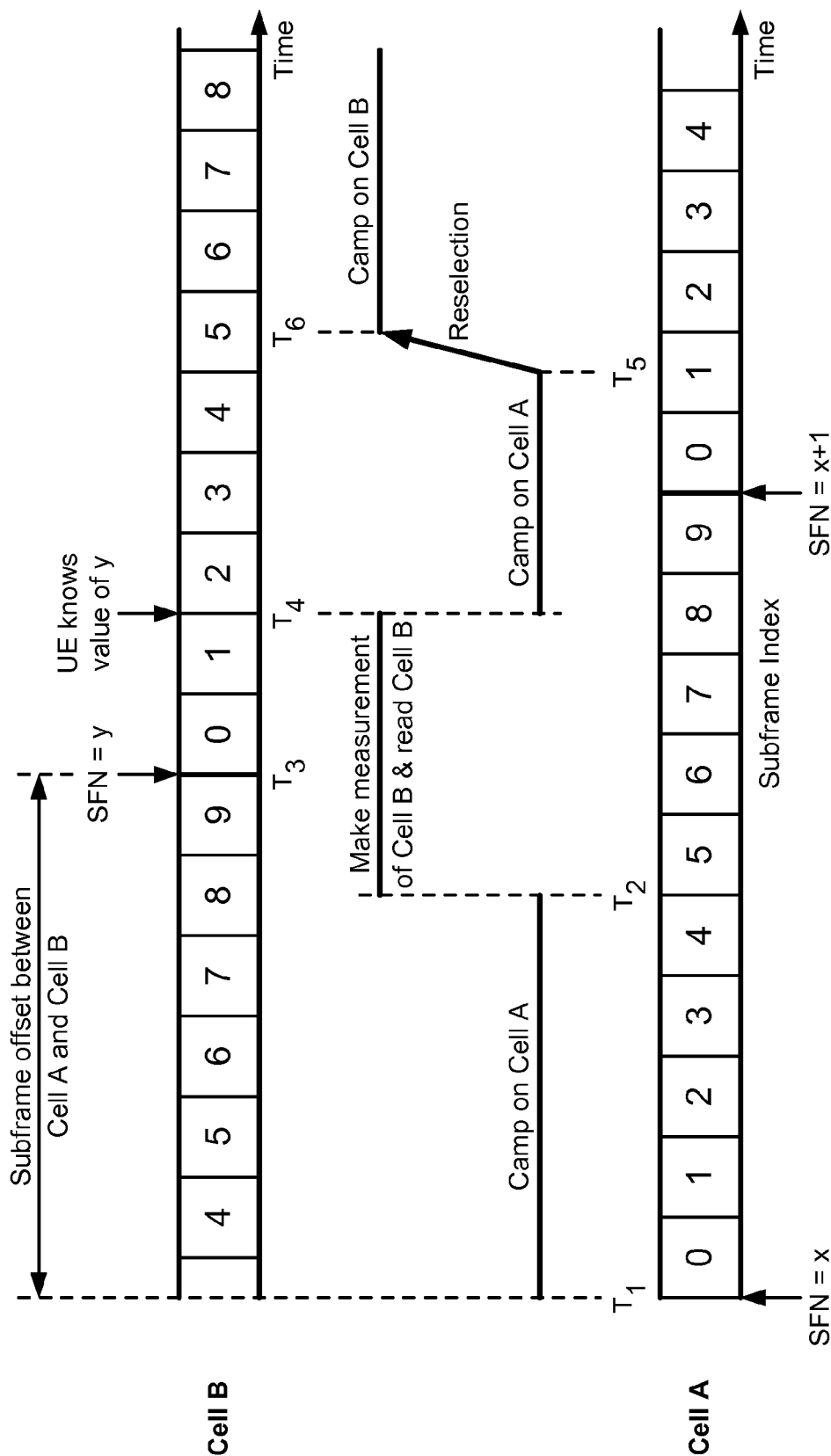
FIG. 5 shows a timeline for determining a timing offset between two cells.

FIG. 5 shows a timeline for determining a timing offset between cell A and cell B at reselection. The UE may be camped on cell A prior to time $T_2$ and may know that cell A has an SFN of x for the radio frame starting at time $T_1$. The UE may switch from cell A to cell B at time $T_2$ and may make measurements of cell B and read some system information from cell B during the time interval from time $T_2$ to time $T_4$. The UE may determine that cell B has an SFN of y for the radio frame starting at time $T_3$. The UE may switch back from cell B to cell A at time $T_4$ and may again camp on cell A. The UE may perform reselection from cell A to cell B starting at time $T_5$ and may camp on cell B starting at time $T_6$.

The UE may determine the subframe offset between cell A and cell B to be equal to the difference between time $T_3$ and time $T_1$. The UE may then determine the timing offset between cell A and cell B as follows:

$$\text{Timing Offset} = \text{Subframe Offset} + \text{Radio Frame Offset,}$$
$$\text{and} \qquad \text{Eq (5)}$$

$$\text{Radio Frame Offset} = (y-x)*10. \qquad \text{Eq (6)}$$

As shown in equation (5), the timing offset between cell A and cell B may be given in units of subframes (or e.g., milliseconds) and may be equal to the subframe offset plus a radio frame offset. As shown in equation (6), the radio frame offset is equal to $(y-x)*10$ and accounts for the difference between the SFN of cell A and the SFN of cell B. The subframe offset may be determined by the UE when the UE first acquires a downlink signal from cell B to make measurements and receive system information. The radio frame offset may be determined by the UE once the UE has received pertinent system information in a MIB from cell B.

The scheme shown in FIG. 5 may also be applicable for a scenario in which the UE arrived in the current serving cell via handover. During handover, the UE may essentially perform the procedure described above for FIG. 5. The UE may determine the subframe offset between the prior serving cell (i.e., the source cell) and the current serving cell (i.e., the target cell) either at the time the target cell is measured or at the time of switching from the source cell to the target cell. The UE may determine the subframe offset based on an output of a searcher in an acquisition process, or an amount of slewing needed to align an internally maintained timeline to the new cell, or some other information. The UE may determine the radio frame offset based, at least in part, on the SFN of the target cell, which may be available to the UE upon reading the MIB of the target cell.

The reselection and handover scenarios described above show that the timing offset between the serving cell and a previously used/occupied cell may be known to the UE. The previously used cell may be a prior serving cell, or a cell on which the UE has previously camped in an idle mode, or some other cell. The UE may store the timing offset between these two cells for later use. The accuracy of the stored timing offset may degrade over time as a result of frequency drift, e.g., in the serving cell. However, this frequency drift may be relatively slow. The frequency drift may be important for very time-sensitive procedures such as actual OTDOA measurements but may have negligible impact in determining measurement gaps, whose timing may be determined at the millisecond level.

In a second scheme, the UE may determine the timing offset between the intermediate cell and the serving cell based on the timing of a neighbor cell measured by the UE. The UE may have been in a serving cell for a long time and may not have taken note of any previous cell. For example, the UE may have powered up in the serving cell and never moved, so there may be no previously occupied cell. In such a situation, the UE should be able to determine the timing of a neighbor cell without leaving the current cell.

In one design, the UE may determine the timing of a neighbor cell based on the procedure shown in FIG. 5 while operating in the idle mode. The UE may have camped on the serving cell while in the idle mode at some point in time, which may be true if the UE is powered up on the serving cell. In this case, the procedure shown in FIG. 5 may be used to obtain timing offsets of neighbor cells. While in the idle mode, the UE may have a rather long discontinuous reception (DRX) cycle, which may indicate paging occasions or time intervals during which paging messages can be sent to the UE. The UE may monitor the serving cell only during the paging occasions applicable for the UE. Between the paging occasions, the UE may measure neighbor cells, e.g., to evaluate cells for possible reselection. The UE may not be required to make measurements of neighbor cells if the serving cell is sufficiently strong, which may be defined by network-configured thresholds such as Sintrasearch and Snonintrasearch. However, the UE may still make measurements of neighbor cells even if the serving cell is sufficiently strong. During these measurements, the UE may receive system information such as MIB and system information block type 1 (SIB1), as shown in FIG. 5. The UE may use the measurement/evaluation procedure to determine a timing offset between a neighbor cell and the serving cell, in similar manner as if the UE was actually going to reselect to the neighbor cell.

In another design, the UE may determine the timing of a neighbor cell based on the procedure shown in FIG. 5 while operating in the connected mode. The UE may operate in the connected mode with the serving cell and may perform the procedure described shown in FIG. 5 to make measurements of neighbor cells. For example, the UE may be configured with DRX or may be given a measurement gap pattern for measurements of inter-frequency neighbor cells in the course of normal operation in the connected mode. The UE may have some idle periods, which may correspond to the time intervals between DRX occasions or measurement gaps. The UE may use the idle periods to make measurements of neighbor cells, read pertinent system information of the neighbor cells, and determine timing offsets between the neighbor cells and the serving cell. The procedure shown in FIG. 5 may be applicable for idle mode scenarios as well as connected mode scenarios. The UE may allocate some of its available time for reception of system information from neighbor cells, which may not be needed for measurements in the connected mode.

The UE may determine the timing of the reference cell based on the timing of the intermediate cell, without having to actually measure the timing of the reference cell. The UE may thus determine the timing offset between the reference cell and the intermediate cell without measuring the timing of the reference cell.

In a first design, the timing of the reference cell may be assumed to be the same as the timing as the intermediate cell if certain conditions are satisfied. For example, the reference cell and the intermediate cell may be assumed to have the same timing if (i) the intermediate cell operates on the same frequency as the reference cell and (ii) the network deployment is synchronous or semi-synchronous within each frequency. A synchronous network deployment is one in which cells have timing that are aligned to a reference time within a particular tolerance. A semi-synchronous network deployment is one in which cells are not strictly synchronized with one another but their reference signal transmission occasions are chosen so as to align with one another to within a certain tolerance. Hence, a UE can know that the PRS occasions for a target cell will occur at the same time (to within the tolerance) as the PRS occasions for the serving cell. A network deployment may be deemed to be synchronous or semi-synchronous if cells in a wireless network are time-aligned at a sub-millisecond level within each frequency of the wireless network. In the first design, the timing offset between the reference cell and the intermediate cell may be assumed to be equal to zero, or $\Delta T_{ref,inter}=0$.

In a second design, the timing of the reference cell may be determined based on assistance data for the intermediate cell, which may be a measurement cell. A positioning server may provide OTDOA assistance data for one or more measurement cells, which may include the intermediate cell. The assistance data may comprise a timing offset between the reference cell and the intermediate cell. In the second design, the timing offset between the reference cell and the intermediate cell may be provided directly by the assistance data.

In a third design, the timing of the reference cell may be determined based on assistance data for a measurement cell. The intermediate cell may operate on the same frequency as at least one measurement cell for which OTDOA assistance data is provided by a positioning server. The network deployment may be synchronous or semi-synchronous on each frequency, and the timing of the intermediate cell may be assumed to be the same as the timing of the at least one measurement cell. The assistance data may provide a timing offset $\Delta T_{ref,meas}$ between the reference cell and the at least one measurement cell. This timing offset $\Delta T_{ref,meas}$ may be assumed to also apply to the intermediate cell, so that $\Delta T_{ref,inter} = \Delta T_{ref,meas}$. In the third design, the timing offset between the reference cell and the intermediate cell may be provided indirectly by the assistance data.

The first design described above may be especially useful since deployments supporting OTDOA may be assumed (e.g., in applicable standards and specifications) to be synchronous or semi-synchronous within each frequency. For example, all cells that take part in OTDOA (possibly with the exception of femto cells) within each frequency may be required to be synchronous or semi-synchronous. The UE may determine the timing of the reference cell by first determining the timing of another cell C on the same frequency as the reference cell, e.g., using either the procedure for determining the timing of a previously used cell or the procedure for determining the timing of a neighbor cell, as described above. The UE may then set the timing of the reference cell to the timing of the measured cell C. The frequency of the reference cell may be provided in OTDOA assistance data, and the UE may identify another cell operating on the same frequency as the reference cell. The strongest and most easily measured cell on the frequency may likely be the reference cell, since a good implementation of the positioning server should attempt to provide a reference cell that offers a good signal to the UE for measurement purposes. In this case, the UE can directly measure the reference cell. However, if the strongest cell is not the reference cell, then the UE can measure the strongest cell and can determine the timing of the reference cell based on the timing of the strongest cell.

The second design may be dependent on whether the UE has measured a cell for which assistance data was provided. The likelihood of this occurring may be fairly high for a good implementation of the positioning server, since assistance data should be provided for cells that can be expected to be visible to the UE.

The third design may be a hybrid of the first and second designs and may cover a common situation in realistic deployments. The UE may measure any cell supporting OTDOA (e.g., any macro cell in case of an OTDOA deployment for all macro cells) on the same frequency as any cell for which assistance data was provided. If the UE is in the idle mode, then this should always be possible unless radio conditions are extremely poor and the UE is unable to read system information from any cell on the same frequency. If the UE is in the connected mode, then the UE may still be able to measure an OTDOA-supporting cell on the same frequency based on the UE's DRX pattern, measurement gaps, or additional UE capabilities, such as a separate receiver that can make measurements on another frequency.

The third design may allow the UE to determine the timing of the reference cell in a case where OTDOA assistance data is provided for an intra-frequency cell (i.e., intra-frequency with respect to the serving cell) that is visible to the UE. In this case, the UE may be able to make intra-frequency measurements of a cell on the same frequency as the serving cell without a DRX pattern or measurement gaps while the UE is in the connected mode. The UE may briefly interrupt downlink reception of the serving cell in order to read the system information of the measured cell in order to determine the SFN of the measured cell.

Three exemplary designs for determining the timing of the reference cell based on the timing of another cell have been described above. The timing of the reference cell may also be determined based on the timing of the intermediate cell in other manners, without having to actually measure the timing of the reference cell.

In another aspect, the UE may provide timing information for cells to the serving cell to enable the serving cell to determine a suitable measurement gap pattern for the UE. In one design, one or both of the following feedback schemes may be supported:
1. Indicate to the serving cell the relative timing of the reference cell; and/or
2. Compute at the UE the timing offset between the reference cell and the serving cell and then modify the timing offsets of measurement cells to take into account the timing offset between the reference cell and the serving cell.

For each feedback scheme, the UE may determine the timing offset between the reference cell and the serving cell, as described above. The timing information provided by the UE may comprise different information for the two feedback schemes.

In the first feedback scheme, the UE may provide timing information comprising the timing offset between the reference cell and the serving cell, $\Delta T_{ref,serv}$, which may correspond to the difference between the boundaries of a designated radio frame (e.g., radio frame 0) of the reference cell and the serving cell. The measurement cells may be synchronous or semi-synchronous with respect to the reference cell, and $\Delta T_{meas,ref}$ may be assumed to be equal to zero. The serving cell may determine the timing offsets between the measurement cells and the serving cell based on the timing offset provided by the UE, e.g., as shown in equation (4).

In the second feedback scheme, the UE may first determine the timing offset between the reference cell and the serving cell. The UE may receive assistance data comprising timing offsets for one or more neighbor cells. The timing offset for each neighbor cell may be provided by a prs-SubframeOffset parameter in the assistance data and may be relative to the reference cell. The UE may compute the timing offsets between the measurement cells and the serving cell based on the timing offsets received in the assistance data and the timing offset between the reference cell and the serving cell, e.g., as shown in equation (4). The UE may send timing information comprising the timing offsets between the measurement cells and the serving cell to the serving cell.

For both the first and second feedback schemes, the serving cell may be provided with sufficient timing information to determine the timing of the reference signals of the measurement cells on each target frequency relative to the timing of the serving cell. The serving cell can then determine a suitable measurement gap pattern for the UE based on the timing information to enable the UE to measure the reference signals of the measurement cells.

Figure 6:
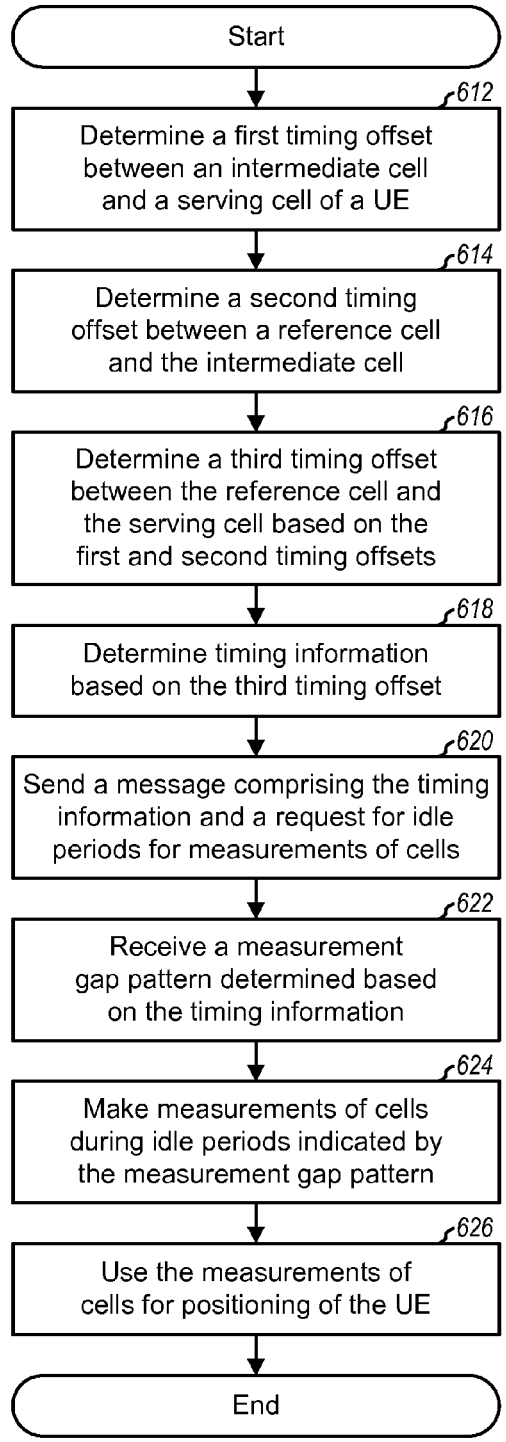
FIG. 6 shows a process for determining timing information for cells.

FIG. 6 shows a design of a process 600 for determining timing information for cells. Process 600 may be performed by a UE (as described below) or by some other entity. The UE may determine a first timing offset between an intermediate cell and a serving cell of the UE (block 612). The UE may also determine a second timing offset between a reference cell and the intermediate cell (block 614). The UE may determine a third timing offset between the reference cell and the serving cell based on the first and second timing offsets, e.g., as shown in equation (3) (block 616).

In one design, the UE may determine timing information based on the third timing offset (block 618). The UE may send a message comprising the timing information and a request for idle periods for measurements of cells (block 620). The UE may thereafter receive a measurement gap pattern determined based on the timing information (block 622). The UE may make measurements of cells during idle periods indicated by the measurement gap pattern (block 624). The UE may use the measurements of cells for positioning of the UE (block 626). In one design of block 626, the measurements may be used to determine OTDOA measurements for pairs of cells. The UE may compute a location estimate for itself based on the OTDOA measurements. Alternatively, the UE may send the OTDOA measurements to a positioning server, which may compute a location estimate for the UE.

In one design of block 612, the intermediate cell may be a prior serving cell of the UE. The UE may determine the first timing offset based on measurements of the serving cell made by the UE while operating on the prior serving cell. The UE may have previously camped on the intermediate cell in an idle mode and may determine the first timing offset based on measurements of cells made by the UE (e.g., based on a cell reselection measurement procedure) while camping on the intermediate cell. Alternatively, the UE may have previously communicated with the intermediate cell in a connected mode and may determine the first timing offset based on measurements of cells made by the UE while operating in the connected mode. The measurements made by the UE may comprise radio resource measurements, which are regular measurements performed by the UE in the connected mode, as configured by a wireless network. In another design of block 612, the intermediate cell may be a cell previously used by the UE.

In another design of block 612, the UE may make measurements of the intermediate cell while operating on the serving cell. The UE may then determine the first timing offset based on the measurements of the intermediate cell. In one scenario, the UE may be camping on the serving cell in the idle mode and may make measurements of cells (e.g., based on a cell reselection measurement procedure) while in the idle mode (e.g., even when the serving cell is sufficiently strong and measurements of cells for reselection are not required). The UE may thus make measurements of cells at a time when radio conditions in the serving cell would normally permit the UE to omit making such measurements, e.g., when the signal strength of the serving cell is sufficiently high that the UE is not required to measure neighboring cells. The UE may determine the first timing offset based on the measurements of cells. In another scenario, the UE may communicate with the serving cell in the connected mode and may make measurements of the intermediate cell while in the connected mode, e.g., as configured by a wireless network. The UE may then determine the first timing offset based on the measurements of the intermediate cell.

In one design of determining the first timing offset, the UE may determine a subframe offset between the intermediate cell and the serving cell and may also determine a radio frame offset between the intermediate cell and the serving cell. The UE may then determine the first timing offset based on the subframe offset and the radio frame offset, e.g., as shown in equation (5). The UE may receive system information from the intermediate cell and may determine an SFN of the intermediate cell based on the system information. The UE may determine the first timing offset (or more specifically, the radio frame offset) based on the SFN of the intermediate cell and the SFN of the serving cell.

In one design, the UE may determine the second timing offset without making measurements of the reference cell. The UE may indirectly determine the timing of the reference cell and determine the second timing offset in various manners.

In one design of block 614, the UE may set the second timing offset to zero based on an assumption of similar timing between the reference cell and the intermediate cell due to (i) the reference cell and the intermediate cell both operating on the same frequency and (ii) a synchronous or semi-synchronous network deployment on this frequency. In another design of block 614, the UE may receive assistance data for at least one cell including the intermediate cell. The assistance data may comprise the second timing offset between the reference cell and the intermediate cell. The UE may obtain the second timing offset from the assistance data. In yet another design of block 614, the UE may receive assistance data for at least one cell operating on the same frequency as the intermediate cell. The assistance data may comprise a fourth timing offset between the reference cell and the at least one cell. The UE may set the second timing offset equal to the fourth timing offset.

In one design of block 618, the timing information may comprise the third timing offset. The UE may send the message comprising the third timing offset to a designated network entity, which may be the serving cell or some other network entity. In another design of block 618, the UE may determine a fourth timing offset between a measurement cell and the serving cell based on (i) the third timing offset between the reference cell and the serving cell and (ii) a fifth timing offset between the measurement cell and the reference cell. The timing information may comprise the fourth timing offset. The UE may send the message comprising the fourth timing offset to the designated network entity. The timing information may also comprise other information to allow the designated network entity to determine the measurement gap pattern for the UE.

Figure 7:
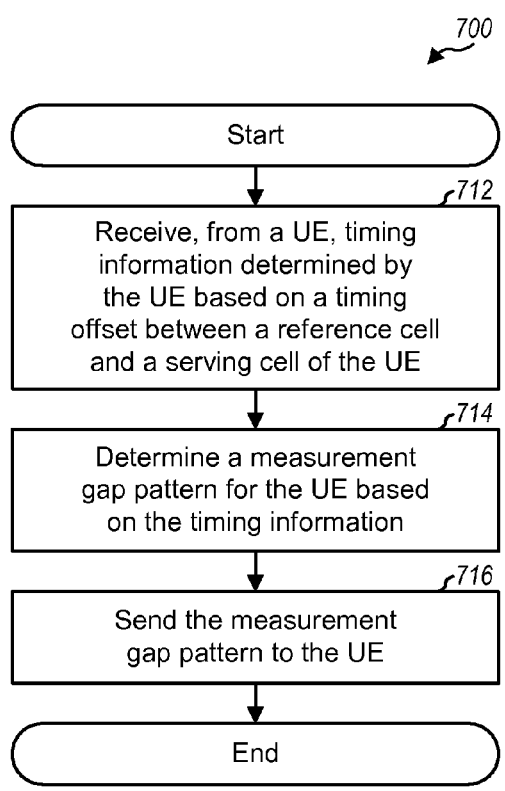
FIG. 7 shows a process for determining a measurement gap pattern for a UE.

FIG. 7 shows a design of a process 700 for determining a measurement gap pattern for a UE. Process 700 may be performed by a serving cell of the UE (as described below) or by some other network entity. The serving cell may receive, from a UE, timing information determined by the UE based on a timing offset between a reference cell and a serving cell of the UE (block 712). The serving cell may determine a measurement gap pattern for the UE based on the timing information (block 714). The serving cell may send the measurement gap pattern to the UE (block 716).

In one design, the timing offset between the reference cell and the serving cell may be determined by the UE based on (i) a first timing offset between an intermediate cell and the serving cell and (ii) a second timing offset between the reference cell and the intermediate cell. In one design, the timing information may comprise the timing offset between the reference cell and the serving cell. In another design, the timing information may comprise a timing offset between a measurement cell and the serving cell, which may be determined based on (i) the timing offset between the reference cell and the serving cell and (ii) a timing offset between the measurement cell and the reference cell, e.g., as shown in equation (4). For both designs, the serving cell may determine the timing offset between the measurement cell and the serving cell (directly or indirectly) based on the timing information. The serving cell may determine the measurement gap pattern based on the timing offset between the measurement cell and the serving cell.

Figure 8:
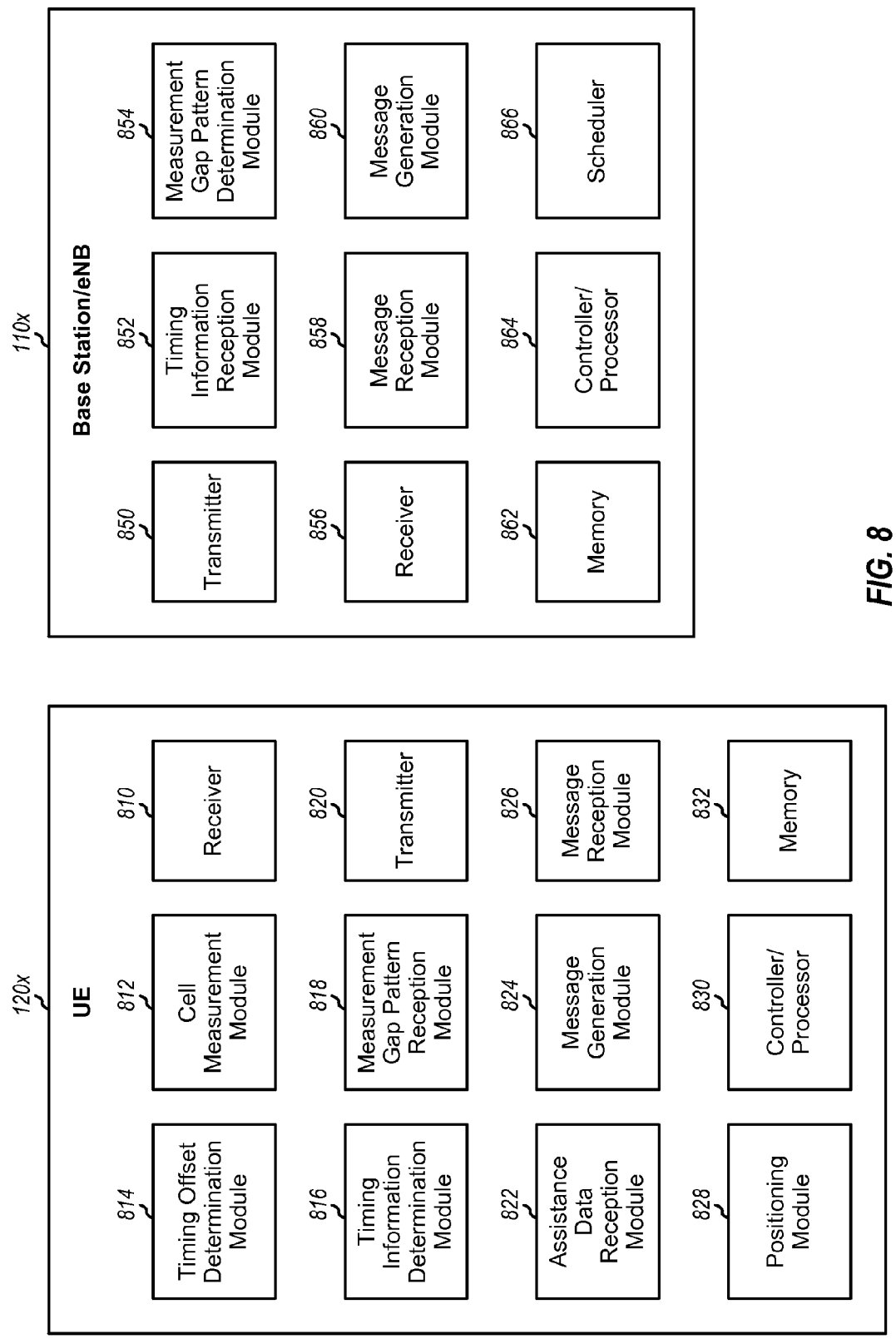
FIG. 8 shows a block diagram of a UE and a base station.

FIG. 8 shows a block diagram of a design of a UE 120x and a base station/eNB 110x, which may be one of the UEs and one of the eNBs in FIG. 1. Within UE 120x, a receiver 810 may receive signals transmitted by base stations (e.g., cells) and other entities. A module 812 may receive reference signals from cells and may make measurements of cells based on the reference signals. A module 814 may determine timing offsets between different cells based on the measurements of cells. For example, module 814 may determine a first timing offset between an intermediate cell and a serving cell of UE 120x as shown in equation (1), a second timing offset between a reference cell and the intermediate cell as shown in equation (2), a third timing offset between the reference cell and the serving cell as shown in equation (3), a fourth timing offset between at least one measurement cell and the serving cell as shown in equation (4), etc.

A module 816 may determine timing information, which may comprise the second timing offset between the reference cell and the intermediate cell, the fourth timing offset between the measurement cell and the serving cell, etc. A module 822 may receive assistance data for measurement cells and may determine the second timing offset and/or the fourth timing offset based on information provided by the assistance data, as described above. A module 818 may receive a measurement gap pattern for UE 120x. Module 812 may make measurements of cells during idle periods indicated by the measurement gap pattern. Module 812 may also make measurements of cells based on the assistance data. A module 826 may receive messages comprising the assistance data, the measurement gap pattern, etc. A module 824 may generate messages comprising the timing information, etc. A transmitter 820 may transmit the messages and other information.

A module 828 may facilitate positioning of UE 120x based on the measurements of cells. Module 828 may compute a location estimate for UE 120x based on the measurements of cells. Module 828 may also send the measurements to the positioning server and may receive a location estimate for UE 120x, which may be determined based on the measurements. The various modules within UE 120x may operate as described above. A controller/processor 830 may direct the operation of various modules within UE 120x. A memory 832 may store data and program codes for UE 120x (e.g., executed by controller/processor 830 and/or other processors/modules).

Within base station/eNB 110x, a transmitter 850 may transmit reference signals, messages, data, and/or other information. A receiver 856 may receive signals transmitted by, e.g., UE 120x and other UEs. A module 852 may receive timing information, e.g., from UE 120x. A module 854 may determine a measurement gap pattern for UE 120x based on the timing information received from UE 120x. A module 858 may receive messages comprising timing information, messages comprising measurements of cells, and/or other messages from UE 120x and other UEs. A module 860 may generate a message comprising the measurement gap pattern for UE 120x and/or other messages for UE 120x and other UEs. The various modules within base station 110x may operate as described above. A controller/processor 864 may direct the operation of various modules within base station 110x. A memory 862 may store data and program codes for base station 110x (e.g., executed by controller/processor 864 and/or other processors/modules). A scheduler 866 may schedule UEs for data transmission.

Figure 9:
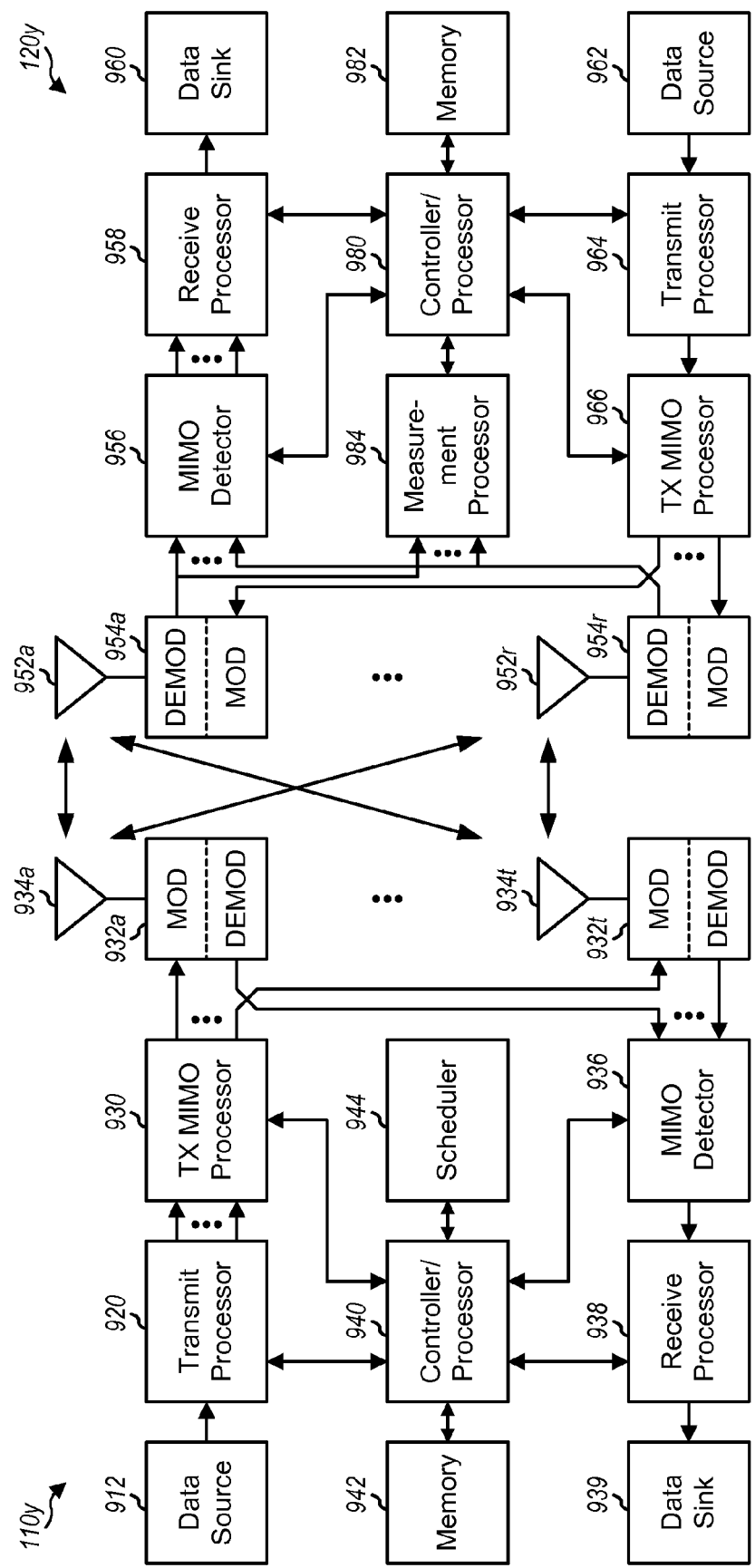
FIG. 9 shows another block diagram of a UE and a base station.

FIG. 9 shows a block diagram of a design of a base station/eNB 110y and a UE 120y, which may be one of the base stations/eNBs and one of the UEs in FIG. 1. Base station 110y may serve one or more cells and may be equipped with T antennas 934a through 934t, where in general T≥1. UE 120y may be equipped with R antennas 952a through 952r, where in general R≥1.

At base station 110y, a transmit processor 920 may receive data from a data source 912 for one or more UEs scheduled for data transmission, process (e.g., encode and modulate) the data for each UE based on one or more modulation and coding schemes selected for that UE, and provide data symbols for all UEs. Transmit processor 920 may also process control information (e.g., for scheduling grants, messages carrying measurement gap patterns, etc.) and provide control symbols. Transmit processor 920 may also generate reference symbols for CRS, PRS, and/or other reference signals. A transmit (TX) multiple-input multiple-output (MIMO) processor 930 may precode the data symbols, the control symbols, and/or the reference symbols (if applicable) and may provide T output symbol streams to T modulators (MOD) 932a through 932t. Each modulator 932 may process its output symbol stream (e.g., for OFDM, etc.) to obtain an output sample stream. Each modulator 932 may further condition (e.g., convert to analog, amplify, filter, and upconvert) its output sample stream to obtain a downlink signal. T downlink signals from modulators 932a through 932t may be transmitted via T antennas 934a through 934t, respectively.

At UE 120y, antennas 952a through 952r may receive the downlink signals from base station 110y and/or other base stations and may provide received signals to demodulators (DEMODs) 954a through 954r, respectively. Each demodulator 954 may condition (e.g., filter, amplify, downconvert, and digitize) its received signal to obtain input samples. Each demodulator 954 may further process the input samples (e.g., for OFDM, etc.) to obtain received symbols. A MIMO detector 956 may obtain received symbols from all R demodulators 954a through 954r, perform MIMO detection on the received symbols, and provide detected symbols. A receive processor 958 may process (e.g., demodulate and decode) the detected symbols, provide decoded data for UE 120y to a data sink 960, and provide decoded control information to a controller/processor 980. A measurement processor 984 may make measurements of cells visible to UE 120y, e.g., during idle periods indicated by a measurement gap pattern for UE 120y.

On the uplink, at UE 120y, a transmit processor 964 may receive and process data from a data source 962 and control information (e.g., timing information, requests for measurement gaps, etc.) from controller/processor 980. Transmit processor 964 may also generate reference symbols for one or more reference signals. The symbols from transmit processor 964 may be precoded by a TX MIMO processor 966 if applicable, further processed by modulators 954a through 954r (e.g., for SC-FDM, OFDM, etc.), and transmitted to base station 110y. At base station 110y, the uplink signals from UE 120y and other UEs may be received by antennas 934, processed by demodulators 932, detected by a MIMO detector 936 if applicable, and further processed by a receive processor 938 to obtain decoded data and control information sent by UE 120y. Processor 938 may provide the decoded data to a data sink 939 and the decoded control information and timing information for cells to controller/processor 940.

Controllers/processors 940 and 980 may direct the operation at base station 110y and UE 120y, respectively. Controller/processor 940 and/or other processors and modules at base station 110y may perform or direct process 700 in FIG. 7 and/or other processes for the techniques described herein. Controller/processor 980 and/or other processors and modules at UE 120y may perform or direct process 600 in FIG. 6 and/or other processes for the techniques described herein.

Memories 942 and 982 may store data and program codes for base station 110y (e.g., executed by controller/processor 940 and/or other processors/modules) and UE 120y (e.g., executed by controller/processor 980 and/or other processors/modules), respectively. A scheduler 944 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a first timing offset between an intermediate cell and a serving cell of a user equipment (UE);
   determining a second timing offset between a reference cell and the intermediate cell; and
   determining a third timing offset between the reference cell and the serving cell based on the first and second timing offsets;
   determining timing information based on the third timing offset; and
   sending, to the serving cell, a message for requesting measurement gaps, wherein the message comprises the timing information.

2. The method of claim 1, further comprising:
   receiving a measurement gap pattern determined based on the timing information in response to the message.

3. The method of claim 2, further comprising:
   making measurements of cells during idle periods indicated by the measurement gap pattern; and
   using the measurements of cells for positioning of the UE.

4. The method of claim 1, wherein the intermediate cell is a prior serving cell of the UE, and wherein the determining the first timing offset comprises determining the first timing offset based on measurements of the serving cell made by the UE while operating on the prior serving cell.

5. The method of claim 1, wherein the UE previously camped on the intermediate cell in an idle mode, and wherein the determining the first timing offset comprises determining the first timing offset based on measurements of cells made by the UE while camping on the intermediate cell.

6. The method of claim 1, wherein the UE previously operated on the intermediate cell in a connected mode, and wherein the determining the first timing offset comprises determining the first timing offset based on measurements of cells made by the UE while in the connected mode.

7. The method of claim 1, wherein the intermediate cell is a cell previously used by the UE.

8. The method of claim 1, further comprising:
making measurements of the intermediate cell by the UE while operating on the serving cell, and wherein the determining the first timing offset comprises determining the first timing offset based on the measurements of the intermediate cell.

9. The method of claim 1, further comprising:
camping on the serving cell by the UE in an idle mode; and
making measurements of cells by the UE while in the idle mode, and wherein the determining the first timing offset comprises determining the first timing offset based on the measurements of cells.

10. The method of claim 9, wherein the making measurements comprises making measurements of cells even when the serving cell is sufficiently strong and measurements of cells for reselection are not required.

11. The method of claim 1, further comprising:
communicating with the serving cell by the UE in a connected mode; and
making measurements of the intermediate cell by the UE while in the connected mode, and wherein the determining the first timing offset comprises determining the first timing offset based on the measurements of the intermediate cell.

12. The method of claim 1, wherein the determining the first timing offset comprises
determining a subframe offset between the intermediate cell and the serving cell,
determining a radio frame offset between the intermediate cell and the serving cell, and
determining the first timing offset based on the subframe offset and the radio frame offset.

13. The method of claim 1, further comprising:
receiving system information from the intermediate cell;
determining a system frame number (SFN) of the intermediate cell based on the system information; and
determining the first timing offset based on the SFN of the intermediate cell.

14. The method of claim 1, wherein the determining the second timing offset comprises determining the second timing offset without making measurements of the reference cell by the UE.

15. The method of claim 1, wherein the determining the second timing offset comprises setting the second timing offset to zero based on the reference cell and the intermediate cell operating on a same frequency and based further on a synchronous or a semi-synchronous network deployment on the same frequency.

16. The method of claim 1, further comprising:
receiving assistance data for at least one cell including the intermediate cell, the assistance data comprising the second timing offset between the reference cell and the intermediate cell, and wherein the determining the second timing offset comprises obtaining the second timing offset from the assistance data.

17. The method of claim 1, further comprising:
receiving assistance data for at least one cell operating on a same frequency as the intermediate cell, the assistance data comprising a fourth timing offset between the reference cell and the at least one cell, and wherein the determining the second timing offset comprises setting the second timing offset equal to the fourth timing offset.

18. The method of claim 1, further comprising:
sending a message comprising the third timing offset by the UE to a designated network entity.

19. The method of claim 1, further comprising:
determining a fourth timing offset between a measurement cell and the serving cell based on the third timing offset between the reference cell and the serving cell and a fifth timing offset between the measurement cell and the reference cell; and
sending a message comprising the fourth timing offset by the UE to a designated network entity.

20. An apparatus for wireless communication, comprising:
means for determining a first timing offset between an intermediate cell and a serving cell of a user equipment (UE);
means for determining a second timing offset between a reference cell and the intermediate cell;
means for determining a third timing offset between the reference cell and the serving cell based on the first and second timing offsets;
means for determining timing information based on the third timing offset; and
means for sending, to the serving cell, a message requesting measurement gaps, wherein the message comprises the timing information.

21. The apparatus of claim 20, further comprising:
means for receiving a measurement gap pattern determined based on the timing information in response to the message.

22. The apparatus of claim 21, further comprising:
means for making measurements of cells during idle periods indicated by the measurement gap pattern; and
means for using the measurements of cells for positioning of the UE.

23. The apparatus of claim 20, wherein the intermediate cell is a prior serving cell of the UE, and wherein the means for determining the first timing offset comprises means for determining the first timing offset based on measurements of the serving cell made by the UE while operating on the prior serving cell.

24. The apparatus of claim 20, further comprising:
means for making measurements of the intermediate cell by the UE while operating on the serving cell, and wherein the means for determining the first timing offset comprises means for determining the first timing offset based on the measurements of the intermediate cell.

25. The apparatus of claim 20, wherein the means for determining the second timing offset comprises means for setting the second timing offset to zero based on the reference cell and the intermediate cell operating on a same frequency and based further on a synchronous or a semi-synchronous network deployment on the same frequency.

26. The apparatus of claim 20, further comprising:
means for receiving assistance data for at least one cell, and wherein the means for determining the second timing offset comprises means for determining the second timing offset based on the assistance data.

27. An apparatus for wireless communication, comprising:
at least one processor configured to:
determine a first timing offset between an intermediate cell and a serving cell of a user equipment (UE),
determine a second timing offset between a reference cell and the intermediate cell, and determine a third timing offset between the reference cell and the serving cell based on the first and second timing offsets;
determine timing information based on the third timing offset, and
send, to the serving cell, a message requesting measurement gaps, wherein the message comprises the timing information.

28. The apparatus of claim 27, wherein the at least one processor is configured
to receive a measurement gap pattern determined based on the timing information in response to the message.

29. The apparatus of claim 28, wherein the at least one processor is configured to:
make measurements of cells during idle periods indicated by the measurement gap pattern, and
use the measurements of cells for positioning of the UE.

30. The apparatus of claim 27, wherein the intermediate cell is a prior serving cell of the UE, and wherein the at least one processor is configured
to determine the first timing offset based on measurements of the serving cell made by the UE while operating on the prior serving cell.

31. The apparatus of claim 27, wherein the at least one processor is configured to:
make measurements of the intermediate cell by the UE while operating on the serving cell, and
determine the first timing offset based on the measurements of the intermediate cell.

32. The apparatus of claim 27, wherein the at least one processor is configured to set the second timing offset to zero based on the reference cell and the intermediate cell operating on a same frequency and based further on a synchronous or a semi-synchronous network deployment on the same frequency.

33. The apparatus of claim 27, wherein the at least one processor is configured to:
receive assistance data for at least one cell, and
determine the second timing offset based on the assistance data.

34. A computer program product, comprising:
a non-transitory processor-readable medium comprising:
code for causing at least one processor to determine a first timing offset between an intermediate cell and a serving cell of a user equipment (UE),
code for causing the at least one processor to determine a second timing offset between a reference cell and the intermediate cell,
code for causing the at least one processor to determine a third timing offset between the reference cell and the serving cell based on the first and second timing offsets;
code for causing the at least one processor to determine timing information based on the third timing offset, and
code for causing the at least one processor to, to the serving cell, a message requesting measurement gaps, wherein the message comprises the timing information.

35. A method for wireless communication, comprising:
receiving, from a user equipment (UE), timing information determined by the UE based on a timing offset between a reference cell and a serving cell of the UE, wherein the timing offset between the reference cell and the serving cell is determined based on a first timing offset between an intermediate cell and the serving cell and a second timing offset between the reference cell and the intermediate cell;
determining a measurement gap pattern for the UE based on the timing information; and
sending the measurement gap pattern to the UE.

36. The method of claim 35, wherein the timing information comprises the timing offset between the reference cell and the serving cell.

37. The method of claim 35, wherein the timing information comprises a second timing offset between a measurement cell and the serving cell, the second timing offset being determined based on the timing offset between the reference cell and the serving cell.

38. The method of claim 35, wherein the determining the measurement gap pattern comprises
determining a second timing offset between a measurement cell and the serving cell based on the timing information, and
determining the measurement gap pattern based on the second timing offset.

39. An apparatus for wireless communication, comprising:
means for receiving, from a user equipment (UE), timing information determined by the UE based on a timing offset between a reference cell and a serving cell of the UE, wherein the timing offset between the reference cell and the serving cell is determined based on a first timing offset between an intermediate cell and the serving cell and a second timing offset between the reference cell and the intermediate cell;
means for determining a measurement gap pattern for the UE based on the timing information; and
means for sending the measurement gap pattern to the UE.

40. The apparatus of claim 39, wherein the means for determining the measurement gap pattern comprises
means for determining a second timing offset between a measurement cell and the serving cell based on the timing information, and
means for determining the measurement gap pattern based on the second timing offset.

41. An apparatus for wireless communication, comprising:
at least one processor configured to:
receive, from a user equipment (UE), timing information determined by the UE based on a timing offset between a reference cell and a serving cell of the UE, wherein the timing offset between the reference cell and the serving cell is determined based on a first timing offset between an intermediate cell and the serving cell and a second timing offset between the reference cell and the intermediate cell,
determine a measurement gap pattern for the UE based on the timing information, and
send the measurement gap pattern to the UE.

42. The apparatus of claim 41, wherein the at least one processor is configured to:
determine a second timing offset between a measurement cell and the serving cell based on the timing information, and
determine the measurement gap pattern based on the second timing offset.

43. A computer program product, comprising:
a non-transitory processor-readable medium comprising:
code for causing at least one processor to receive, from a user equipment (UE), timing information determined by the UE based on a timing offset between a reference cell and a serving cell of the UE, wherein the timing offset between the reference cell and the serving cell is determined based on a first timing offset between an intermediate cell and the serving cell and a second timing offset between the reference cell and the intermediate cell, code for causing the at least one processor to determine a measurement gap pattern for the UE based on the timing information, and code for causing the at least one processor to send the measurement gap pattern to the UE.

* * * * *